(12) United States Patent
Tharp

(10) Patent No.: US 9,354,454 B1
(45) Date of Patent: May 31, 2016

(54) EYEGLASS TETHER ATTACHMENT SYSTEMS

(71) Applicant: Frances Tharp, Davidson, NC (US)

(72) Inventor: Frances Tharp, Davidson, NC (US)

( * ) Notice: Subject to any disclaimer, the term of this patent is extended or adjusted under 35 U.S.C. 154(b) by 0 days.

(21) Appl. No.: 14/683,398

(22) Filed: Apr. 10, 2015

Related U.S. Application Data

(60) Provisional application No. 61/978,907, filed on Apr. 13, 2014.

(51) Int. Cl.
*G02C 3/00* (2006.01)
*G02C 11/02* (2006.01)

(52) U.S. Cl.
CPC .............. *G02C 3/006* (2013.01); *G02C 11/02* (2013.01); *G02C 2200/02* (2013.01); *G02C 2200/26* (2013.01)

(58) Field of Classification Search
CPC ... G02C 2200/24; G02C 3/003; G02C 5/2254
USPC ........... 351/157, 156, 155, 121, 158, 111, 41; 2/452
See application file for complete search history.

(56) References Cited

U.S. PATENT DOCUMENTS

| 5,367,347 | A | * | 11/1994 | Wilson | G02C 3/003 24/3.3 |
| 5,654,787 | A | * | 8/1997 | Barison | G02C 3/003 351/157 |
| 5,898,472 | A | * | 4/1999 | Oshikawa | G02C 3/02 351/156 |
| 6,450,640 | B1 | * | 9/2002 | Van Rysselberghe | G02C 3/003 351/123 |
| 6,547,388 | B1 | * | 4/2003 | Bohn | G02C 3/003 351/117 |
| 6,918,669 | B1 | * | 7/2005 | Tamborrino | G02C 3/04 242/380 |
| 7,013,491 | B2 | * | 3/2006 | Ferrara | G02C 3/02 2/10 |
| 7,338,158 | B2 | | 3/2008 | Glinert | |
| 7,419,260 | B1 | * | 9/2008 | Wang | G02C 3/003 351/156 |
| 8,317,317 | B2 | | 11/2012 | Pulvino | |
| 8,366,268 | B2 | | 2/2013 | Willaims | |
| 8,545,011 | B2 | | 10/2013 | Chow | |
| 8,622,540 | B2 | | 1/2014 | Burnstein | |
| 2006/0114408 | A1 | * | 6/2006 | Skuro | G02C 3/003 351/156 |
| 2006/0268222 | A1 | * | 11/2006 | Tracy | G02C 3/02 351/157 |
| 2007/0046893 | A1 | | 3/2007 | Freeman | |

* cited by examiner

*Primary Examiner* — Hung Dang
(74) *Attorney, Agent, or Firm* — RG Patent Consulting, LLC; Rachel Gilboy

(57) ABSTRACT

An eyeglass tether attachment system is a device that is used in pairs to attach to the ear-pieces of a pair of glasses that each end of a tether can be securely attached to. In addition, the exterior facing surface of the device can display a picture, sports indicia, or initials. The device has a spool and a cap that snap together and spring-rotate in relation to each other to open a passageway for inserting the eyeglass ear-piece. The cap has an integrally formed ring for attaching to the ends of a tether.

20 Claims, 5 Drawing Sheets

EYEGLASS TETHER ATTACHMENT SYSTEMS

CROSS-REFERENCE TO RELATED APPLICATION

The present application is related to and claims priority from prior provisional application Ser. No. 61/978,907, filed Apr. 13, 2014 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of eyeglass accessories and more specifically relates to an eyeglass tether attachment system.

2. Description of the Related Art

According to the Vision Council of America, two-thirds of the United States population wears prescription glasses, 11% of the population wears readers and 85% of the population wears sunglasses. That equates to approximately 269 million people. Over the last 50 years, the evolution of eyewear has gone from "function to fashion", and the availability of attractive and fashionable eyewear is greater and more available than ever before. People are choosing eyewear and eyewear accessories as an integral means of expressing their individualism and a medium to accentuate their personalities. This is evidenced by the growing number of people who do not need glasses for corrective purposes but choose to wear eyeglasses as a fashion accessory anyway. From teenagers to baby boomers, people are embracing eyewear as a vehicle for self expression. Eyeglasses are no longer considered just a necessity for the visually impaired, but rather a fashion accessory.

The most popular and convenient way people choose to keep their eyewear handy during their daily activities is to attach their glasses to a decorative necklace, cord or chain worn around the neck. The necklace, cord or chain typically has some type of connector at each end that attaches to each temple piece of the eyeglasses. The connector itself is attached to the ends of the necklace, cord, or chain by either an elastic loop, small metal ring, or some sort of adhesive. Currently, the only connector options available for these necklaces, cords, or chains are alligator clips which were never intended to be very fashionable, or hollow rubber tips that only fit onto the ends of the temple pieces and are not adjustable, or rubber bands that loop over the temple pieces. The most commonly used of these options is the rubber band-like connector. It is threaded through a bead or metal coil that is supposed to aid in adjusting the tension and securing the position of the rubber loop on the temple piece.

The downside of these options is that they are unattractive, uncomfortable, and frequently break. Breakage and slippage is the biggest dilemma associated with these connectors, especially the rubber band loops which are the most commonly used connectors. Trying to adjust the bead or metal coil in order to tighten and better secure the rubber loop onto the temple piece is a tedious and aggravating process. The quality and resilience of these connectors do not often provide an equivalent amount of security for the price paid for the glasses. When these connectors break, the process to replace them is time-consuming and aggravating. These connectors are extremely hard to find as individually sold products. And, if they can be found, most people either don't know how to replace the connector, or they simply don't have the time to "mess with" the tedious process. A solution is desirable.

Various attempts have been made to solve the above-mentioned problems such as those found in U.S. Pat. No. 8,545,011 to Yee Ling Chow, U.S. Pat. No. 8,317,317 to Eric Charles Pulvino, U.S. Pat. No. 8,622,540 to Tracey E. Burnstein, U.S. Pub. No. 2007/0046893 to Patricia Freeman, U.S. Pat. No. 8,366,268 to Ronald Wade Willaims, and U.S. Pat. No. 7,338,158 to Robert Glinert. This art is representative of eyeglass retention devices. None of the above inventions and patents, taken either singly or in combination, is seen to describe the invention as claimed.

Ideally, an eyeglass retention device should provide ease of use and security, and yet, would operate reliably and be manufactured at a modest expense. Thus, a need exists for a reliable eyeglass tether attachment system to avoid the above-mentioned problems.

BRIEF SUMMARY OF THE INVENTION

In view of the foregoing disadvantages inherent in the known eyeglass retention means art, the present invention provides a novel eyeglass tether attachment system. The general purpose of the present invention, which will be described subsequently in greater detail, is to provide a fashionable, secure, and convenient tether attachment system for eyeglasses.

The eyeglass tether attachment system as disclosed herein is designed for providing security to prevent a user from unintentionally dropping or losing a pair of eyeglasses while displaying a user preferred indicia. The eyeglass tether attachment system may comprise an attachment assembly having a spool with an inner wall, a spacer portion, an outer wall, an ear-piece through-hole, a first coil-spring anchor-hole, a coil spring having a first end and a second end, a cap having a second coil-spring anchor-hole, an attachment ring, a graphic lens recess, and a graphic lens.

The spool of the attachment assembly is attachable to the ear-piece of a pair of eyeglasses by inserting the end of the ear-piece through the ear-piece through-hole and releasing the cap to allow the attachment assembly to frictionally-contract on the ear-piece. The inner wall, the outer wall, and the spacer portion of the spool are integrally formed of a single material. The inner wall of the spool, when attached to an ear-piece, is located on the inner side of the ear-piece and the outer wall is located on the outer side of the ear-piece during an in-use condition. The distance between the inner wall and the outer wall are maintained via the integral spacer portion.

The coil spring is located between the outer wall of the spool and the inner surface of the cap. The first coil spring anchor-hole is located in the outer wall of the spool near the outer periphery. The first end and a second end of the coil spring are preferably bent 90 degrees from a plane formed by the nestable coil portion of the coil spring are angled preferably pointing 180 degrees away from each other. The first end of the coil spring is anchored in the first coil spring anchor-hole of the outer wall of the spool and the second end of the coil spring is anchored in the second coil-spring anchor-hole of the cap. The second coil-spring anchor-hole is slightly off-center in the cap. The coil spring is sandwiched between the outer surface of the outer wall of the spool and an inner surface of the cap. The coil spring is anchored to the spool and the cap thereby making all three parts functionally operational together.

The cap biasingly snaps onto the spool via attachment ears inwardly located on snap-prongs on the cap. The cap may comprise two snap-prongs each having an arcuate shaped ear or ridge that is structured and arranged to snap over the outside of the inner wall of the spool. The snap-prongs are slideably rotatable along a back side of the inner wall. There is a space between the snap-prongs that is able to biasingly align, via the coil spring, and facilitate insertion of the ear-piece through the through-hole of the spool during the biased state, and then in a relaxed state of the coil spring, the space and the ear-piece through-hole do not align. The spool and the cap are cylindrical in shape. The attachment assembly may comprise a hard plastic so that the spool and the cap are able to rotate against each other without substantial friction. The coil spring allows the spool and the cap to biasingly rotate relative to each other for a limited rotation and to align the space and the ear-piece through-hole such that the ear-piece of the pair of eyeglasses is able to be inserted therethrough. The cap, when released from a biasingly rotated position, is able to cause the passage formed by the space and the ear-piece through-hole to decrease in size such that the inserted ear-piece is biasingly gripped by the attachment assembly.

The attachment ring is non-removably attached to the outer periphery of the cap. The attachment ring and the cap are integral and may comprise equivalent (similar or the same) material. The graphic lens recess is concentrically located on the outer side of the cap and snaps into the graphic lens recess of the cap. The graphic lens preferably comprises a convex shape which may facilitate viewing the displayed indicia from a greater angle to the sides.

In a second embodiment, the attachment assembly may comprise a tube grip, a snap base, and a snap. In this embodiment, the snap and the snap base each comprise a magnetic member embedded within an elastically deformable material so that the snap and the snap base are joined by not only the shape, but by the magnetic attraction. The snap base and the tube grip are integral and the snap is separately attachable and performs basically the same function as the graphic lens and the attachment device for the tether since the snap comprises the attachment ring. The device is attached to the ear-piece of the glasses by the tube grip which can be stretched over the ear-piece to maintain its position. The tube grip is stretchable so that the ear-piece is able to be inserted, and contractable again, similar to a rubber band, so that the tube grip is able to sufficiently grip the ear-piece of the eyeglasses. The attachment assembly is intended for use in pairs, one for each ear-piece of the glasses, to removably attach each end of the tether to the attachment ring of each respective attachment assembly and looped around a neck of the user to prevent unintentional dropping of the pair of eyeglasses, and for fashionably displaying an indicia on the graphic lens of the cap.

The eyeglass tether attachment system may further comprise a kit that includes at least two attachment assemblies each having a spool, a cap, an attachment ring, a graphic lens having indicia adhered to the outside surface of the graphic lens, and at least one set of user instructions.

A method of using the eyeglass tether attachment system may comprise the steps of rotating the spool and the cap in relation to each other to open a passageway, inserting the earpiece of the set of eyeglasses through the passageway, releasing the cap to grip the earpiece of the eyeglasses, attaching the first end of a tether to the attachment ring of the first attachment assembly, attaching the second end of the tether to the second attachment assembly, wearing the eyeglasses having the first attachment assembly and the second attachment assembly, and removing and storing the eyeglass assembly.

The present invention holds significant improvements and serves as an eyeglass tether attachment system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, eyeglass tether attachment systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to an eyeglass retention device and more particularly to an eyeglass tether attachment system as used to improve the fashion, security, and convenience of an eyeglass tethering system.

Generally speaking, the eyeglass tether attachment system is a device that is used in pairs to attach to the ear-pieces of a pair of glasses that each end of a tether can be securely attached to. In addition, the exterior facing surface of the device can display a picture, sports indicia, or initials (or the like). The device has a spool and a cap that snap together and spring-rotate in relation to each other to open a passageway for inserting the eyeglass ear-piece. The cap has an integrally formed ring for attaching to the ends of a tether.

Figure 1:
FIG. 1 shows a perspective view illustrating an in-use condition of an eyeglass tether attachment system according to an embodiment of the present invention.

Referring to the drawings by numerals of reference there is shown in FIG. 1, a perspective view illustrating an in-use condition of eyeglass tether attachment system 100 according to an embodiment of the present invention.

Eyeglass tether attachment system 100 is designed for providing security to prevent a user from unintentionally dropping or losing pair of eyeglasses 115 while displaying a user preferred indicia 165. Eyeglass tether attachment system 100 comprises attachment assembly 105 that is intended for use in pairs, one for each ear-piece 110 of pair of eyeglasses 115, to removably attach each end 170 of tether 175 to attachment ring 154 of each respective attachment assembly 105 and looped around the neck of the user to prevent unintentional dropping of pair of eyeglasses 115, and for fashionably displaying a user preferred indicia 165 on graphic lens 160 of cap 150. Indicia 165 may be a symbol, initials, a company logo, a sports team logo, a color, a pattern, or any other user preferred markings. Attachment assembly 105 of eyeglass tether attachment system 100 has circular recessed area 180 that graphic lens 160 snaps into or is adhesively attached to that indicia 165 is displayed on. Attachment assembly 105 fastens to ear-piece 110 between the wearer's ear and the lens of pair of eyeglasses 115.

Figure 2A:
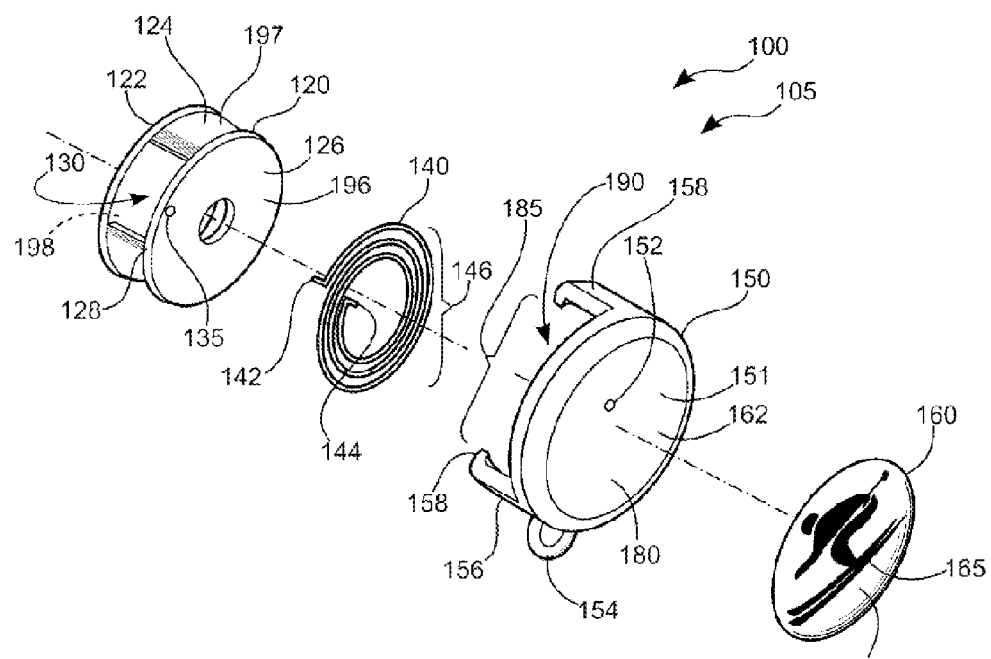
FIG. 2A is an exploded view illustrating the eyeglass tether attachment system according to an embodiment of the present invention of FIG. 1
Figure 2B:
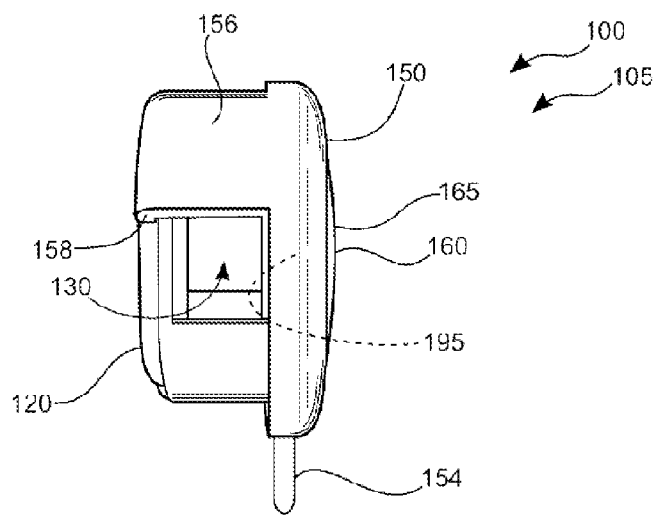
FIG. 2B is a front view illustrating the eyeglass tether attachment system according to an embodiment of the present invention of FIG. 1.

Referring now to FIGS. 2A and 2B, an exploded view and a front view, respectively, illustrating eyeglass tether attachment system 100 according to an embodiment of the present invention of FIG. 1.

First coil-spring anchor-hole 135 is located in outer wall 126 of spool 120 near outer periphery 128. First end 142 and second end 144 of coil spring 140 are bent 90 degrees from a plane formed by nestable coil portion 146 of coil spring 140. First end 142 and second end 144 of coil spring 140 are angled pointing 180 degrees away from each other. First end 142 of coil spring 140 is anchored in first coil-spring anchor-hole 135 of outer wall 126 of spool 120 and second end 144 of coil spring 140 is anchored in second coil-spring anchor-hole 152 of cap 150. Second coil-spring anchor-hole 152 is slightly off-center in cap 150. Spool 120 and cap 150 are preferably cylindrical in shape. Coil spring 140 allows spool 120 and cap 150 to biasingly rotate relative to each other for a limited rotation.

Eyeglass tether attachment system 100 may comprise attachment assembly 105 having spool 120 with inner wall 122, spacer portion 124, outer wall 126, ear-piece through-hole 130, first coil-spring anchor-hole 135, coil spring 140 having first end 142 and second end 144, cap 150 having second coil-spring anchor-hole 152, attachment ring 154, graphic lens recess 162, and graphic lens 160. Spool 120 of attachment assembly 105 is attachable to ear-piece 110 of pair of eyeglasses 115 by inserting ear-piece end 112 of ear-piece 110 through ear-piece through-hole 130 and releasing cap 150 to allow attachment assembly 105 to frictionally-contract on ear-piece 110. Inner wall 122, outer wall 126, and spacer portion 124 of spool 120 are integrally formed of a single material in a preferred embodiment. In other embodiments, attachment ring 154 may be a stiff circular shaped wire. Inner wall 122 of spool 120, when attached to ear-piece 110, is located on inner side 123 of ear-piece 110 and outer wall 126 is located on outer side 111 of ear-piece 110 during an in-use condition.

The distance between inner wall 122 and outer wall 126 are maintained via the integrally formed spacer portion 124. Cap 150 has snap-prongs 156 as a means of coupling to spool 120. Snap-prongs 156 snap over spool 120 and biasingly grip spool 120 via inwardly facing attachment ears 158. There is space 185 between snap-prongs 156 that is able to biasingly align and facilitate insertion of ear-piece 110 through through-hole 190 during a biased state, and then in a relaxed state of coil spring 140, space 185 and ear-piece through-hole 130 do not align. Cap 150 is structured and arranged to biasingly rotate to align space 185 and ear-piece through-hole 130 such that ear-piece 110 of pair of eyeglasses 115 is able to be inserted therethrough. Cap 150, when released from a biasingly rotated position, is able to cause the passage formed by the alignment of space 185 and ear-piece through-hole 130 to decrease in size such that the inserted ear-piece 110 is gripped by attachment assembly 105.

Figure 3A:
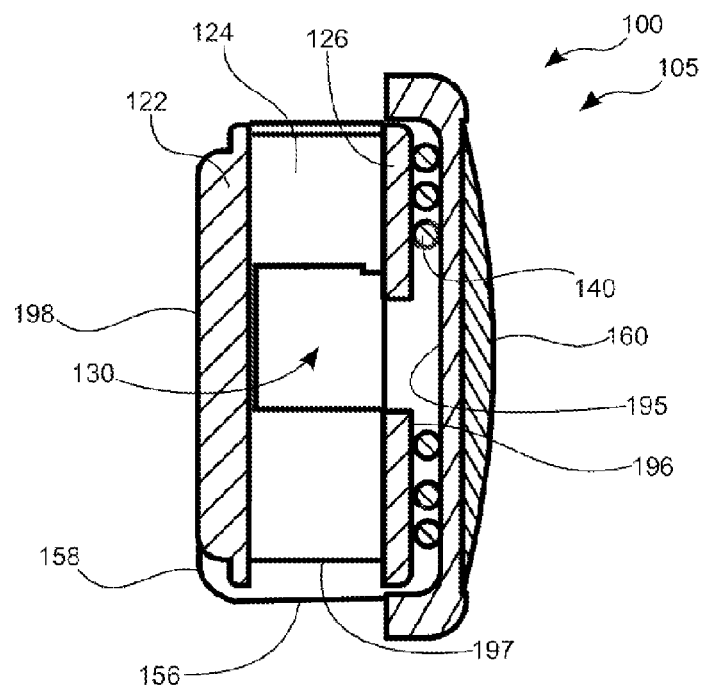
FIG. 3A is a cutaway view illustrating a cut-away view of the eyeglass tether attachment system according to an embodiment of the present invention of FIG. 1.
Figure 3B:
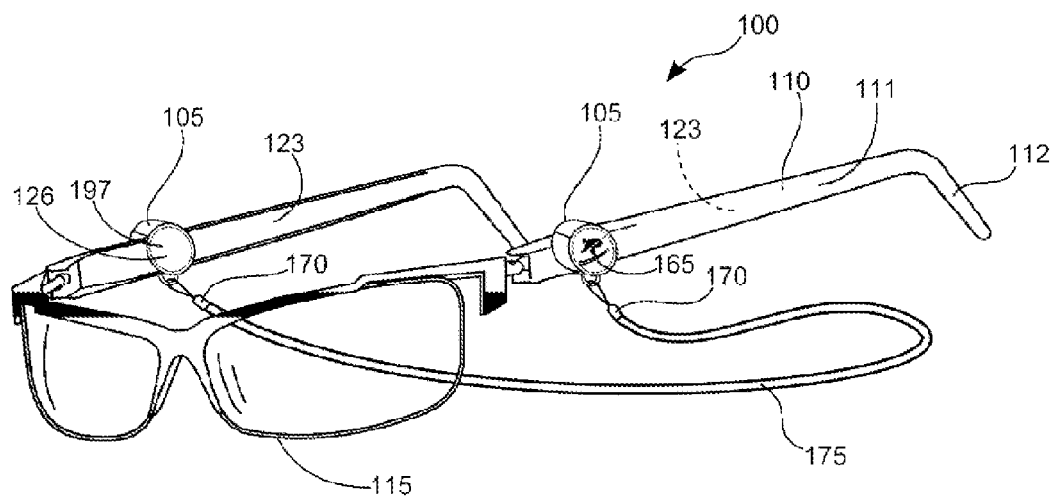
FIG. 3B is a perspective view illustrating the eyeglass tether attachment system installed on a pair of eyeglasses according to an embodiment of the present invention of FIG. 1.

Referring now to FIG. 3A, is a cutaway view illustrating attachment assembly 105 and FIG. 3B, illustrates pair of eyeglasses 115 having a pair of installed attachment assemblies 105 of eyeglass tether attachment system 100 according to an embodiment of the present invention of FIG. 1.

Coil spring 140 is located between outer wall 126 of spool 120 and inner surface 195 of cap 150. Coil spring 140 is sandwiched between outer surface 196 of outer wall 126 of spool 120 and inner surface 195 of cap 150. Coil spring 140 is anchored to each one via first coil-spring anchor-hole 135 and second coil-spring anchor-hole 152. Cap 150 biasingly snaps onto spool 120 via attachment ears 158 inwardly located on snap-prongs 156 on cap 150. Cap 150 may comprise two snap-prongs 156 each having an arcuate shaped attachment ear 158 or ridge that is structured and arranged to snap over and lock onto outside 197 of inner wall 122 of spool 120. Snap-prongs 156 are slideably rotatable along back side 198 of inner wall 122. Attachment ring 154 is non-removably attached to outer periphery 128 of cap 150. Attachment ring 154 and cap 150 are integral and comprise equivalent material. Graphic lens recess 162 is concentrically located on exterior surface 151 of cap 150 and graphic lens 160 snaps into graphic lens recess 162 of cap 150. Graphic lens 160 preferably comprises a convex shape. Attachment assembly 105 may comprise a hard plastic so that spool 120 and cap 150 are able to rotate against each other without substantial friction.

Figure 4A:
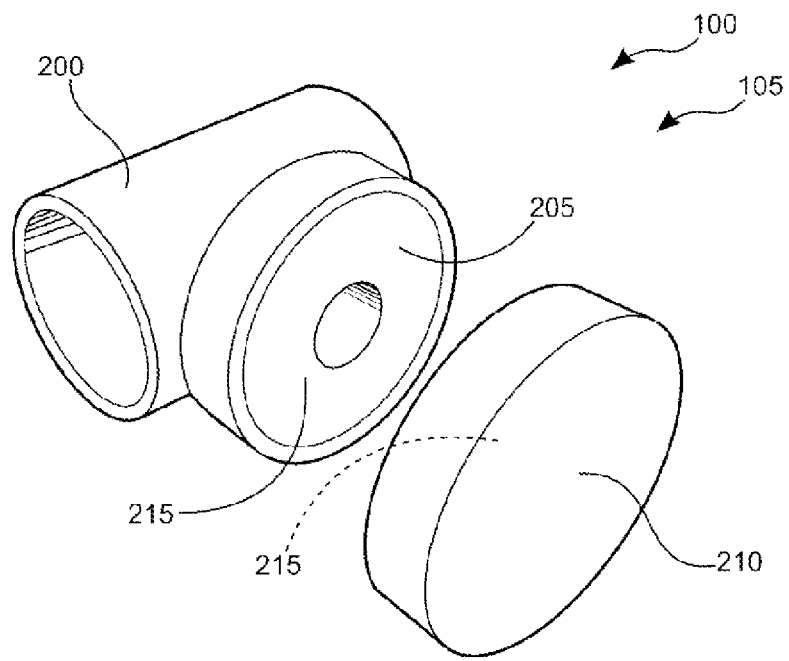
FIG. 4A is a perspective view illustrating a second embodiment of the eyeglass tether attachment system according to an embodiment of the present invention of FIG. 1.
Figure 4B:
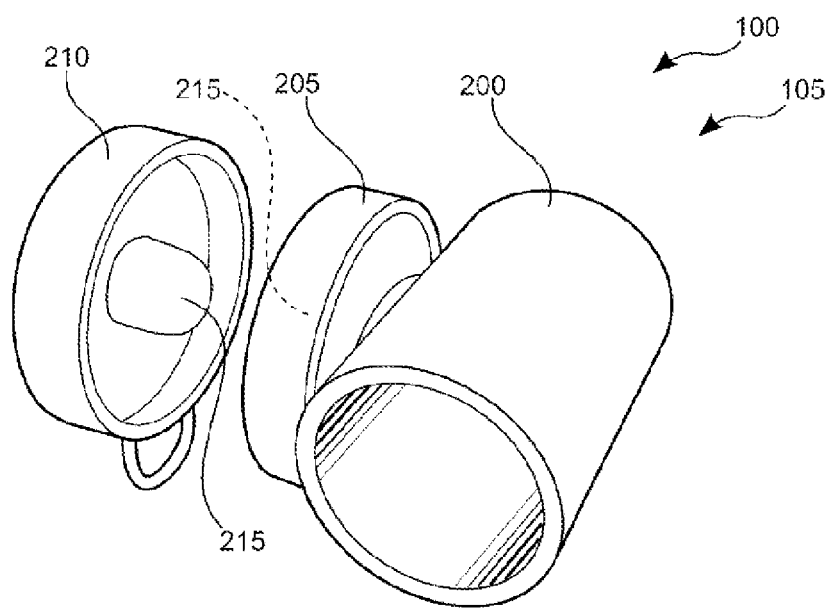
FIG. 4B is an opposing perspective view of FIG. 4A showing the second embodiment illustrating the eyeglass tether attachment system according to an embodiment of the present invention of FIG. 1.

Referring now to FIGS. 4A, and 4B, showing opposing perspective views illustrating a second embodiment of eyeglass tether attachment system 100 according to an embodiment of the present invention of FIG. 1.

In a second embodiment, attachment assembly 105 may comprise tube grip 200, snap base 205, and snap 210. In this embodiment, snap 210 and snap base 205 each comprise magnetic member 215 embedded within an elastically deformable material so that snap 210 and snap base 205 are joined by not only the shape, but by the magnetic attraction. Snap base 205 and tube grip 200 are integral and snap 210 is separately attachable and performs basically the same function as graphic lens 160 and the attachment device for tether 175 since snap 210 comprises attachment ring 154. The device is attached to ear-piece 110 of pair of eyeglasses 115 by tube grip 200 which can be stretched over ear-piece 110 to maintain its position. Tube grip 200 is stretchable so that ear-piece 110 is able to be inserted, and contractable so that tube grip 200 is able to sufficiently grip ear-piece 110 of pair of eyeglasses 115.

Eyeglass tether attachment system 100 may be sold as kit 450 comprising the following parts: at least two attachment assemblies 105 each having spool 120, cap 150, attachment ring 154, graphic lens 160 having indicia 165 adhered to outside surface 199 of graphic lens 160, and at least one set of user instructions. The kit has instructions such that functional relationships are detailed in relation to the structure of the invention (such that the invention can be used, maintained, or the like in a preferred manner). Eyeglass tether attachment system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different attachment and indicia combinations, parts may be sold separately, etc., may be sufficient.

Figure 5:
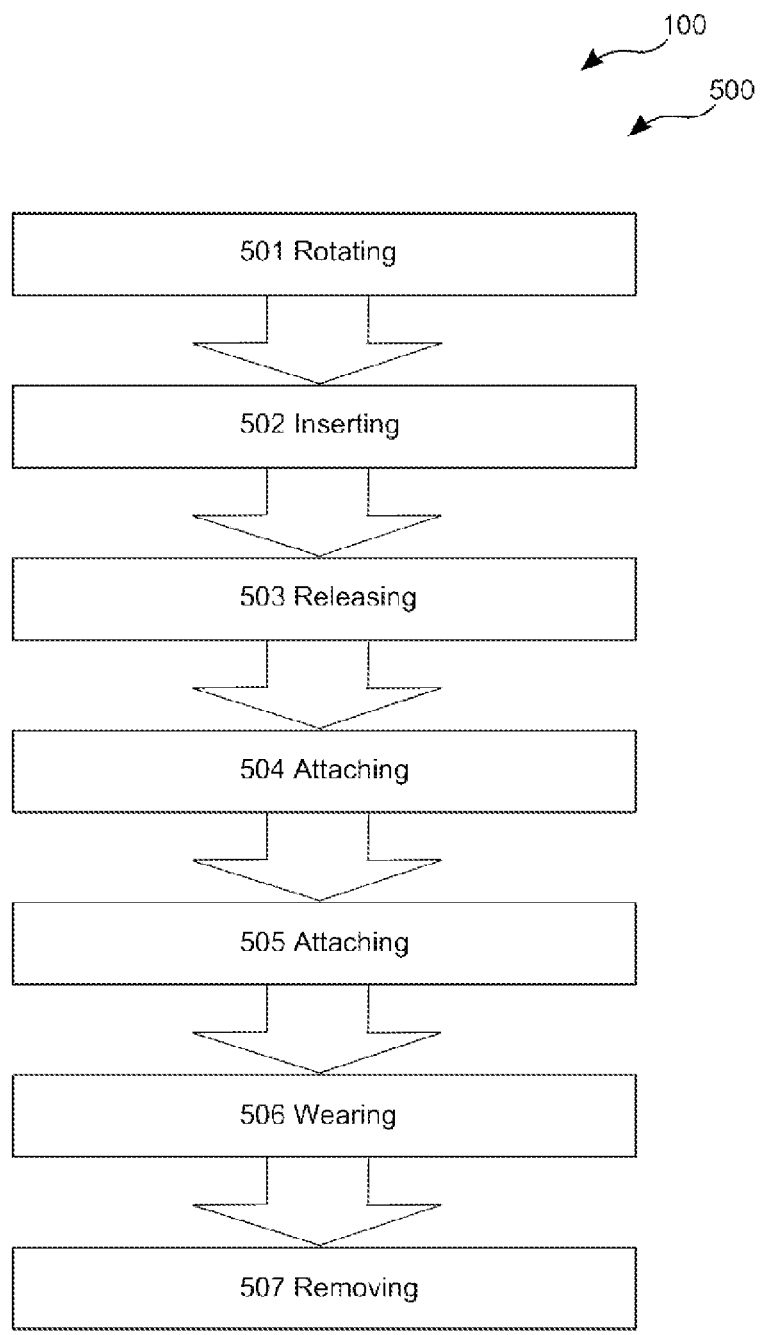
FIG. 5 is a flowchart illustrating a method of use for the eyeglass tether attachment system according to an embodiment of the present invention of FIGS. 1-4.

Referring now to FIG. 5, showing method of use 500 for eyeglass tether attachment system 100.

A method of using (method of use 500) eyeglass tether attachment system 100 may comprise the steps of step one 501, rotating spool 120 and cap 150 in relation to each other to open ear-piece through-hole 130; step two 502 inserting ear-piece 110 of pair of eyeglasses 115 through ear-piece through-hole 130; step three 503 releasing cap 150 to grip ear-piece 110 of pair of eyeglasses 115; step four 504 attaching one end 170 of tether 175 to attachment ring 154 of the first attachment assembly 105; step five 505 attaching the other end 170 of tether 175 to the second attachment assembly 105; step six 506 wearing pair of eyeglasses 115 having the first attachment assembly 105 and the second attachment assembly 105; and step seven 507 removing and storing pair of eyeglasses 115 with the installed attachment assemblies 105.

It should be noted that steps 504-506 are optional steps and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An eyeglass tether attachment system comprising:
    an attachment assembly having;
        a spool having;
            an inner wall;
            a spacer portion;
            an outer wall;
            an ear-piece through-hole;
            a first coil-spring anchor-hole; and
            a coil spring having a first end and a second end; and
        a cap having;
            a second coil-spring anchor-hole;
            an attachment ring;
            a graphic lens recess; and
            a graphic lens;
    wherein said eyeglass tether attachment system comprises said attachment assembly, said attachment assembly structured and arranged for providing security against a user unintentionally dropping a pair of eyeglasses;
    wherein said spool of said attachment assembly is attachable to an ear-piece of said pair of eyeglasses via said ear-piece of said pair of eyeglasses passing through said ear-piece through-hole and frictionally-contracting thereon said ear-piece;
    wherein said inner wall, said outer wall, and said spacer portion are integrally formed, said inner wall located on an inner side of said ear-piece and said outer wall located on an outer side of said ear-piece during an in-use condition and said distance between said inner wall and said outer wall maintained via said spacer portion;
    wherein said first coil spring anchor-hole is located in said outer wall of said spool near an outer periphery;
    wherein said coil spring is located between said outer wall of said spool and said inner surface of said cap;
    wherein said first end of said coil spring is anchored in said first coil spring anchor-hole of said outer wall of said spool and said second end of said coil spring is anchored in said second coil-spring anchor-hole of said cap;
    wherein said cap snaps onto said spool, said cap biasingly attached to said spool via attachment ears on said cap;
    wherein said attachment ring is non-removably attached to an outer periphery of said cap;
    wherein said graphic lens recess is concentrically located on an outer side of said cap;
    wherein said graphic lens snaps into said graphic lens recess of said cap; and
    wherein said attachment assembly is useful in pairs for removably attaching to a left said ear-piece and a right said ear-piece of said pair of eyeglasses such that a tether is able to be removably attached to said attachment ring of each respective said attachment assembly and looped around a neck of said user to prevent unintentional dropping of said pair of eyeglasses and for displaying an indicia on said graphic lens of said cap.

2. The eyeglass tether attachment system of claim 1 wherein said coil spring allows said spool and said cap to biasingly rotate relative to each other for a limited rotation.

3. The eyeglass tether attachment system of claim 1 wherein said first end and a second end of said coil spring are bent 90 degrees from a plane formed by a nestable coil portion of said coil spring.

4. The eyeglass tether attachment system of claim 3 wherein said first end and a second end of said coil spring are angled pointing 180 degrees away from each other.

5. The eyeglass tether attachment system of claim 1 wherein said cap comprises two snap-prongs having ears that are structured and arranged to snap over said inner wall of said spool, said snap-prongs slideably rotatable along a back side of said inner wall.

6. The eyeglass tether attachment system of claim 5 wherein said snap-prongs comprise a space between said snap-prongs that is able to biasingly align with said ear-piece through-hole such that in a relaxed state of said coil spring, said space and said ear-piece through-hole do not align.

7. The eyeglass tether attachment system of claim 1 wherein said cap is structured and arranged to biasingly rotate to align said space and said ear-piece through-hole such that said ear-piece of said pair of eyeglasses is able to be inserted therethrough.

8. The eyeglass tether attachment system of claim 1 wherein said cap, when released from a biasingly rotated position is able to cause a passage formed by said space and said ear-piece through-hole to decrease in size such that an inserted said ear-piece is gripped by said attachment assembly.

9. The eyeglass tether attachment system of claim 1 wherein said attachment ring and said cap are integral and comprise equivalent material.

10. The eyeglass tether attachment system of claim 1 wherein said spool and said cap are cylindrical in shape.

11. The eyeglass tether attachment system of claim 1 wherein said coil spring is sandwiched between an outer surface of said outer wall and an inner surface of said cap, said coil spring anchored to each one via said first coil-spring anchor-hole and said second coil-spring anchor-hole.

12. The eyeglass tether attachment system of claim 1 wherein said graphic lens comprises a convex shape.

13. The eyeglass tether attachment system of claim 1 wherein said second coil-spring anchor-hole is slightly off-center in said cap.

14. The eyeglass tether attachment system of claim 1 wherein said attachment assembly comprises hard plastic such that said spool and said cap are rotatable against each other.

15. The eyeglass tether attachment system of claim 1 wherein said attachment assembly comprises a tube grip, a snap base, and a snap.

16. The eyeglass tether attachment system of claim 1 wherein said snap and said snap base each comprise a magnetic attachment embedded within an elastically deformable material such that said tube grip is stretchable such that an ear-piece is able to be inserted, and contractable such that said tube grip is able to sufficiently grip said ear-piece of said eyeglasses.

17. The eyeglass tether attachment system of claim 1 wherein said snap comprises said attachment ring.

18. An eyeglass tether attachment system comprising:
an attachment assembly having;
  a spool having;
    an inner wall;
    a spacer portion;
    an outer wall;
    an ear-piece through-hole;
    a first coil-spring anchor-hole; and
    a coil spring having a first end and a second end; and
  a cap having;
    a second coil-spring anchor-hole;
    an attachment ring;
    a graphic lens recess; and
    a graphic lens;

wherein said eyeglass tether attachment system comprises said attachment assembly, said attachment assembly structured and arranged for providing security against a user unintentionally dropping a pair of eyeglasses;

wherein said spool of said attachment assembly is attachable to an ear-piece of said pair of eyeglasses via said ear-piece of said pair of eyeglasses passing through said ear-piece through-hole and frictionally-contracting thereon said ear-piece;

wherein said inner wall, said outer wall, and said spacer portion are integrally formed, said inner wall located on an inner side of said ear-piece and said outer wall located on an outer side of said ear-piece during an in-use condition and said distance between said inner wall and said outer wall maintained via said spacer portion;

wherein said first coil spring anchor-hole is located in said outer wall of said spool near an outer periphery;

wherein said coil spring is located between said outer wall of said spool and said inner surface of said cap;

wherein said first end and a second end of said coil spring are bent 90 degrees from a plane formed by a nestable coil portion of said coil spring;

wherein said first end and a second end of said coil spring are angled pointing 180 degrees away from each other;

wherein said first end of said coil spring is anchored in said first coil spring anchor-hole of said outer wall of said spool and said second end of said coil spring is anchored in said second coil-spring anchor-hole of said cap;

wherein said second coil-spring anchor-hole is slightly off-center in said cap;

wherein said coil spring is sandwiched between an outer surface of said outer wall and an inner surface of said cap, said coil spring anchored to each one via said first coil-spring anchor-hole and said second coil-spring anchor-hole;

wherein said cap snaps onto said spool, said cap biasingly attached to said spool via attachment ears on said cap;

wherein said cap comprises two snap-prongs having ears that are structured and arranged to snap over said inner wall of said spool, said snap-prongs slideably rotatable along a back side of said inner wall;

wherein said snap-prongs comprise a space between said snap-prongs that is able to biasingly align with said ear-piece through-hole such that in a relaxed state of said coil spring, said space and said ear-piece through-hole do not align;

wherein said spool and said cap are cylindrical in shape;

wherein said coil spring allows said spool and said cap to biasingly rotate relative to each other for a limited rotation;

wherein said cap is structured and arranged to biasingly rotate to align said space and said ear-piece through-hole such that said ear-piece of said pair of eyeglasses is able to be inserted therethrough;

wherein said cap, when released from a biasingly rotated position is able to cause a passage formed by said space and said ear-piece through-hole to decrease in size such that an inserted said ear-piece is gripped by said attachment assembly;

wherein said attachment ring is non-removably attached to an outer periphery of said cap;

wherein said attachment ring and said cap are integral and comprise equivalent material;

wherein said graphic lens recess is concentrically located on an outer side of said cap;

wherein said graphic lens snaps into said graphic lens recess of said cap;

wherein said graphic lens comprises a convex shape;

wherein said attachment assembly comprises hard plastic such that said spool and said cap are rotatable against each other;

wherein said attachment assembly comprises a tube grip, a snap base, and a snap;

wherein said snap and said snap base each comprise a magnetic attachment embedded within an elastically deformable material such that said tube grip is stretchable such that an ear-piece is able to be inserted, and contractable such that said tube grip is able to sufficiently grip said ear-piece of said eyeglasses;

wherein said snap comprises said attachment ring; and wherein said attachment assembly is useful in pairs for removably attaching to a left said ear-piece and a right said ear-piece of said pair of eyeglasses such that a tether is able to be removably attached to said attachment ring of each respective said attachment assembly and looped around a neck of said user to prevent unintentional dropping of said pair of eyeglasses and for displaying an indicia on said graphic lens of said cap.

19. The eyeglass tether attachment system of claim 18 further comprising a kit including:
- at least two said attachment assemblies each having said spool, said cap, said attachment ring, and said graphic lens having an indicia adhered to an outside surface of said graphic lens; and
- at least one set of user instructions.

20. A method of using an eyeglass tether attachment system comprising the steps of:
- rotating a spool and a cap in relation to each other to open a passageway;
- inserting an earpiece of an eyeglasses through said passageway;
- releasing said cap to grip said earpiece of said eyeglasses;
- attaching a first end of a tether to an attachment ring of a first attachment assembly;
- attaching a second end of said tether to a second attachment assembly;
- wearing said eyeglasses having said first attachment assembly and said second attachment assembly; and
- removing and storing said eyeglass assembly.

* * * * *